Jan. 4, 1966  R. J. PAGLIUSO  3,227,409

PAN-TILT HEAD

Filed May 27, 1963

INVENTOR.
ROBERT J. PAGLIUSO
BY C. G. Stratton
ATTORNEY

3,227,409
PAN-TILT HEAD

Robert J. Pagliuso, La Canada, Calif., assignor to Hollywood Products Corporation, Chicago, Ill., a corporation of Illinois
Filed May 27, 1963, Ser. No. 283,341
3 Claims. (Cl. 248—183)

This invention relates to a pan-tilt head for cameras and other optical devices.

An object of the present invention is to provide a head that may be arranged to be operated by either hand to change the angle of tilt of the camera mounting plate as well as controlling panning of the head around a vertical axis.

Another object of the invention is to provide a pan-tilt head of the character above referred to in which the reversible means that controls tilt and panning is combined with means imposing a panning-resisting friction that smooths the operation and constitutes a position-retaining means, also.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

Figure 1:
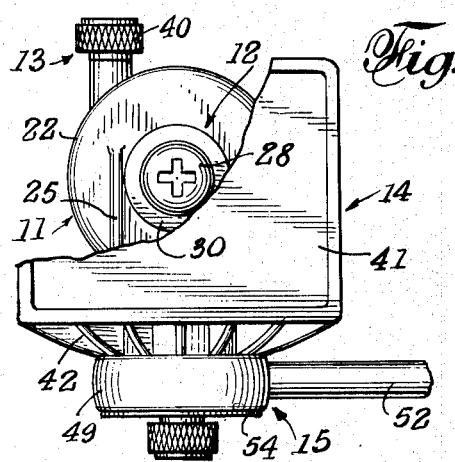
FIG. 1 is a partly broken plan view of a pan-tilt head according to the present invention.

The present pan-tilt head is shown as mounted on the upper end of a tube 10 which may, in turn, be mounted on a tripod to be vertically adjustable.

The present head comprises, generally, a body 11, means 12 rotationally connecting said body and the upper end of tube 10, wedge means 13 in the body to frictionally engage the tube 10 to either lock the head against rotation around the axis of the tube or impose position-retaining and adjusting friction between the head and tube, a camera-mounting plate 14 tiltably carried by the body, a reversible and adjustable handle 15 for said camera plate 14, the handle embodying means to releasably clamp the head 11 and plate 14 to hold the latter in handle-adjusted angular position relative to the head 11.

The tube 10 comprises a thin-walled member having an end fitting 20 with a reduced portion 21. It will be understood that said tube, by means not involved in the present invention, is adjustably movable longitudinally and adapted to be clamped in adjusted position.

The body 11 is preferably formed of high-impact plastic and has a base portion 22 that is provided with a bore 23 into which the tube fitting 20 extends and with a reduced bore 24 into which the fitting portion 21 extends. An offset extension 25 of said body is integrally provided with a laterally extending hub 26 through which an axial bore 27 extends.

The means 12 is shown as a screw 28 that is engaged in a screw seat 29 in the fitting 20 and its reduced portion 21, a washer 30 being interposed between the head of said screw 28 and the end surface 31 of the base portion. A shoulder 32 in said fitting engages a cover plate 33 that closes the opposite end of the base portion to enable relative rotational movement of the tube 10 and the head when the screw 28 is drawn up snug. Hence, the head is fully rotational on the axis of the tube.

Figure 4:
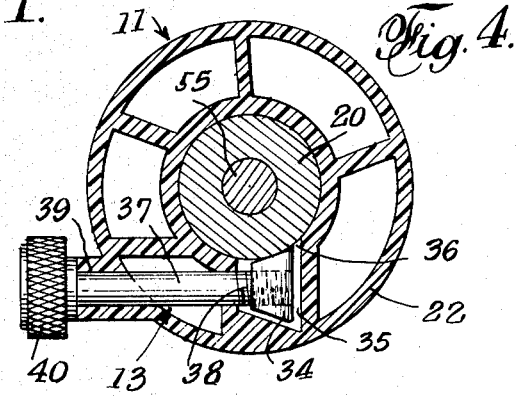
FIG. 4 is a cross-sectional view as taken on the line 4—4 of FIG. 3.
Figure 2:
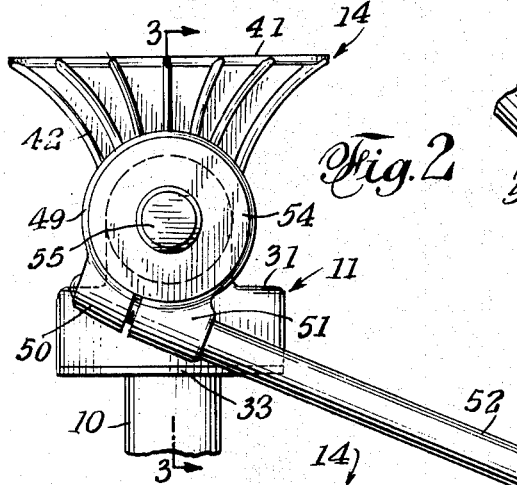
FIG. 2 is a side elevational view thereof.

The wedge means 13 is best seen in FIG. 4 and is shown as a trapezoidal wedge element 34 residing in a cavity 35 in the base portion 22 of the head. Said cavity has an open side 36 opening on the bore 23. A shaft 37 with a threaded end 38 is journalled in a bore 39 in said base portion, and a knurled knob 40 on the end of said shaft enables rotation of the latter to draw the element 34 into frictional engagement with the cylindrical face of the fitting 20. The friction may be adjusted to either lock the head 11 to the tube 10 or impose a frictional drag that resists but does not prevent relative rotation of said head and tube.

Figure 3:
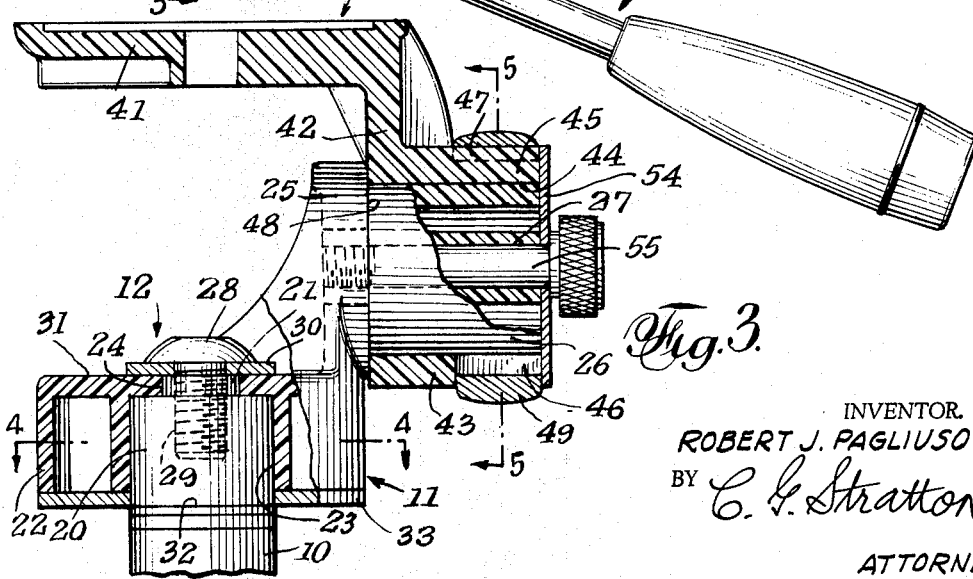
FIG. 3 is an enlarged vertical sectional view as taken on the line 3—3 of FIG. 2, portions being shown in elevation.

The camera mounting plate 14 is also preferably made of high-impact plastic, the same having a rectangular base plate 41 on which a camera may be mounted, an offset extension 42 extending from an edge of said base plate, and a tubular, laterally directed sleeve 43 at the end of the extension 42. Said sleeve has a bore 44 into which the hub 26 rotationally fits so the plate 14 may be tilted about the axis of the hub 26. Said sleeve 43 has a reduced end 45 that has a longitudinal split 46, and diametrally opposite said slit, said sleeve is provided with key means 47 which are here shown as three rounded splines. As shown in FIG. 3, said hub 26 and sleeve 43 are longitudinally coextensive with the sleeve abutting an annular shoulder 48 on the head extension 25. The base plate 41 and the base 22 are generally vertically aligned, as can be seen in FIG. 3.

Figure 5:
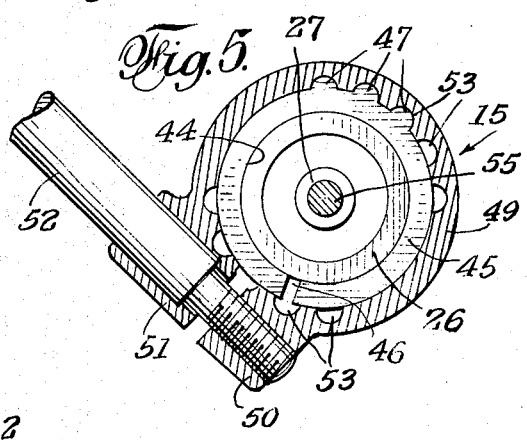
FIG. 5 is a vertical sectional view as taken on the line 5—5 of FIG. 3.

The handle 15 is shown as a split band 49 encircling the split sleeve end 45 with one threaded end 50 and with an aligned end 51, and with a handle part 52 that extends through the band end 51 and is threadedly engaged with the end 50. At least one set of notches 53 (two sets are shown) is provided in the inner face of the band 49 to fit the splines 47. Five notches provide a set. Therefore, the three splines shown and the notches may have three different angles of engagement to enable many different angular adjustments of the band and its handle part 52 relative to the camera mounting plate 14. FIG. 5 shows a structure that enables right to left change of arrangement of the handle part as well as enabling applying the band 49 with the split thereof up rather than down, as shown.

The handle 15 may be slid endwise onto the sleeve end 45 and after a plate 54 is applied to the end of said sleeve end and to the flush ends of the hub 26 and the band 49, a bolt 55 that extends through the bore 27 is used to secure the assembly in which the band and sleeve turn together, because of the splines 47 and grooves 53, to angularly adjust the plate 14 relative to the head 11 about the axis of the bolt 55. Right or left hand handle manipulation provides for a more facile operation, as desired.

It is only necessary to turn the handle part 52 axially to draw up on the band 49 and cause the same to contract the split sleeve end 45 around the hub 26 to lock the plate 14 to the base 11.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A pan-tilt head comprising:
   (a) a tubular extension of a tripod provided with an upwardly facing shoulder spaced below the end thereof and with a reduced end portion,
   (b) a molded plastic body mounted on said tubular extension and having a metal bottom part in support engagement with said shoulder, a bore being formed in the upper part of the body in which the reduced end portion of the tubular extension is fitted,
   (c) screw and washer means connected to the end of the tubular extension and confining the body to a position in rotational engagement with the portion of the tubular extension between said shoulder and the reduced end portion,
   (d) said body being integrally provided with an upwardly direct extension that is offset from the axis of the tubular extension, and with an integral hub that extends laterally outwardly from the extension, said hub having an axial bore on an axis that is transverse to the axis of the tubular extension,
   (e) a camera-mounting molded plastic plate disposed in spaced relation above and substantially centered with said tubular extension and the body mounted thereon,
   (f) said mounting plate being integrally provided with a depending, laterally offset sleeve that is fitted on the laterally extending hub of the body and has a longitudinal contraction slit, and
   (g) a handle rotationally adjustably mounted on said sleeve and provided with means to contract said slitted sleeve around said hub, said handle constituting a means for turning the body on the axis of the tubular extension in a panning movement of a camera on said plate, and for rotatively moving the camera mounting plate on the transverse axis of the body hub to tilt said plate and the camera thereon.

2. A pan-tilt head according to claim 1 in which the handle comprises a split clamp band around said sleeve, and an elongated handle part that, by rotation on its own axis, expands and contracts the clamp band relative to said split sleeve to expand and contract said sleeve, accordingly.

3. A pan-tilt head according to claim 2 in which a selectively adjustable spline connection between said sleeve and clamp band is provided to enable right to left hand disposition of the handle part with respect to the pan-tilt head, said spline connection comprising:
   (a) a group of longitudinal splines on the outer surface of the sleeve in diametrically opposite relation to the split in the sleeve, and
   (b) two diametrically opposite groups of circumferentially spaced longitudinal grooves in the inner surface of the clamp band,
   (c) there being more grooves than splines, said grooves being divided into two circumferentially spaced groups, and the portions of the inner surface between said groups being in engagement with the outer surface of the sleeve between the splines and the slit therein.

References Cited by the Examiner

UNITED STATES PATENTS

| | | | |
|---|---|---|---|
| 1,812,117 | 6/1931 | Rastetter | 248—230 X |
| 2,212,953 | 8/1940 | Popp | 248—230 X |
| 2,237,281 | 4/1941 | Diesbach | 248—183 |
| 2,471,886 | 5/1949 | Nielsen | 248—183 |
| 2,619,312 | 11/1952 | Tulchin | 248—183 |

CLAUDE A. LE ROY, *Primary Examiner.*

FRANK L. ABBOTT, *Examiner.*